United States Patent
Ko et al.

(10) Patent No.: US 10,091,793 B2
(45) Date of Patent: Oct. 2, 2018

(54) PRIORITIZED GENERATION OF IDC INDICATION MESSAGE TO MITIGATE IDC IMPACT ON UE PERFORMANCE

(71) Applicant: MEDIATEK INC., Hsinchu (TW)

(72) Inventors: Li-Chun Ko, Taipei (TW); Yih-Shen Chen, Hsinchu County (TW); Yu-Ting Chen, Chiayi County (TW); Chung-Wei Wang, New Taipei (TW); Yi-Chien Wang, Hsinchu County (TW)

(73) Assignee: MEDIATEK INC., HsinChu (TW)

( * ) Notice: Subject to any disclaimer, the term of this patent is extended or adjusted under 35 U.S.C. 154(b) by 24 days.

(21) Appl. No.: 15/016,431

(22) Filed: Feb. 5, 2016

(65) Prior Publication Data
US 2016/0234852 A1 Aug. 11, 2016

Related U.S. Application Data

(60) Provisional application No. 62/112,857, filed on Feb. 6, 2015.

(51) Int. Cl.
*H04W 72/08* (2009.01)
*H04W 76/28* (2018.01)
(Continued)

(52) U.S. Cl.
CPC ......... *H04W 72/082* (2013.01); *H04L 5/0005* (2013.01); *H04L 5/22* (2013.01);
(Continued)

(58) Field of Classification Search
CPC ........ H04L 5/0005; H04L 5/22; H04W 16/14; H04W 72/0413; H04W 72/044;
(Continued)

(56) References Cited

U.S. PATENT DOCUMENTS

| 2012/0252442 A1 | 10/2012 | Fu et al. ............. 455/426.1 |
| 2013/0242833 A1* | 9/2013 | Ahn .............. H04W 72/082 370/311 |

(Continued)

FOREIGN PATENT DOCUMENTS

| CN | 104202065 A | 10/2010 |
| WO | WO2014168226 A1 | 4/2013 |

OTHER PUBLICATIONS

Intel Corporation, "Signaling procedure for in-device coexistence", R2-121729, 3GPP TSG RAN WG2 Meeting #77bis, Mar. 26-30, 2012.*

(Continued)

*Primary Examiner* — Khoa Huynh
(74) *Attorney, Agent, or Firm* — Imperium Patent Works; Zheng Jin

(57) ABSTRACT

A UE controls in-device coexistence (IDC) indication message generation to mitigate potential throughput impact on UE to maintain UE performance as much as possible. Under the proposed method, FDM-based solution is always preferred by the UE. Based on the IDC indication message generated by the UE, a network applies an IDC interference mitigation solution that prioritizes FDM-based solution. Specifically, the UE first sends an IDC message requesting FDM-based solution. In case the serving eNB does not respond, the UE sends a new IDC message by alternating IDC option. Even if a TDM-based solution has been received, the UE may continue requesting FDM-based solution to gain UE performance.

20 Claims, 6 Drawing Sheets

(51) Int. Cl.
| | |
|---|---|
| *H04L 5/00* | (2006.01) |
| *H04L 5/22* | (2006.01) |
| *H04W 76/04* | (2009.01) |
| *H04W 16/14* | (2009.01) |
| *H04W 72/04* | (2009.01) |
| *H04W 88/06* | (2009.01) |

(52) U.S. Cl.
CPC ......... *H04W 76/048* (2013.01); *H04W 76/28* (2018.02); *H04W 16/14* (2013.01); *H04W 72/044* (2013.01); *H04W 72/0413* (2013.01); *H04W 88/06* (2013.01)

(58) Field of Classification Search
CPC . H04W 76/048; H04W 72/08; H04W 72/082; H04W 72/12; H04W 88/06; H04W 76/28
See application file for complete search history.

(56) References Cited

U.S. PATENT DOCUMENTS

| | | | |
|---|---|---|---|
| 2014/0036745 A1 | 2/2014 | Koo et al. | 370/311 |
| 2014/0198672 A1* | 7/2014 | Koo | H04W 72/1215 370/252 |
| 2014/0334330 A1 | 11/2014 | Baghel et al. | 370/252 |
| 2015/0382364 A1 | 12/2015 | Sharma | 370/329 |

OTHER PUBLICATIONS

International Search Report and Written Opinion of International Search Authority for PCT/CN2016/073707 dated May 13, 2016 (11 pages).
EPO, search report for the EP patent application 16746154.0 dated Oct. 30, 2017 (11 pages).
3GPP TSG RAN WG2 Meeting #77bis R2-121729, Intel Corporation, Signaling procedure for in-device coexistence, Jeju, Korea dated Mar. 26-30, 2012. *Sections 2.1 and 2.2*.
3GPP TSG RAN WG2 Meeting #79bis R2-124741, New Postcom, IDC indications prohibition mechanism, Bratislava, Slovakia dated Oct. 8-12, 2012. *Sections 2.1 and 2.2*.
3GPP TSG RAN WG2 Meeting #76 R2-115847, Huawei et al., Assistance information handling concerning the FDM and TDM solution, San Francisco, USA dated Nov. 14-18, 2011. *Sections 2.2 and 2.3*.

* cited by examiner

PRIORITIZED GENERATION OF IDC INDICATION MESSAGE TO MITIGATE IDC IMPACT ON UE PERFORMANCE

CROSS REFERENCE TO RELATED APPLICATIONS

This application claims priority under 35 U.S.C. § 119 from U.S. Provisional Application No. 62/112,857, entitled "Prioritized Generation of IDC Indication Message to Mitigate IDC Impact on UE Performance," filed on Feb. 6, 2015, the subject matter of which is incorporated by reference.

TECHNICAL FIELD

The disclosed embodiments relate generally to wireless network communications, and, more particularly, to solutions for in-device coexistence (IDC) interference avoidance.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio.

Due to scarce radio spectrum resource, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located on the same physical device, therefore, can suffer significant degradation including significant in-device coexistence (IDC) interference between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the first radio transceiver transmission. Likewise, data transmission of the second radio transceiver can interfere with data reception of the first radio transceiver.

A new IDC indication message comprising two options is provided by LTE Rel.11 to avoid potential radio interference within the same device. Under FDM (Frequency Division Multiplexing) option, a user equipment (UE) reports interfered frequency and the network moves the UE away from the troubled frequency by handover. This option provides a quick approach with almost no performance impact at the expense of possible LTE spectrum waste. Under TDM (Time Division Multiplexing) option, a UE suggests LTE TX pattern to the network by DRX (Discontinuous Reception)-like gap, subframe bitmap gap. This option provides the best spectrum efficiency with full range LTE B40 and Wi-Fi 2.4 GHz operation but suffers performance impact on throughput due to time-sharing between radios. A method of controlling IDC indication message generation to mitigate potential throughput impact on UE is sought.

SUMMARY

A UE controls in-device coexistence (IDC) indication message generation to mitigate potential throughput impact on UE to maintain UE performance as much as possible. Under the proposed method, FDM-based solution is always preferred by the UE. Based on the IDC indication message generated by the UE, a network applies an IDC interference mitigation solution that prioritizes FDM-based solution. Specifically, the UE first sends an IDC message requesting FDM-based solution. In case the serving eNB does not respond, the UE sends a new IDC message by alternating IDC option. Even if a TDM-based solution has been received, the UE may continue requesting FDM-based solution to gain UE performance.

In one embodiment, a UE detects an IDC interference problem between a first radio transceiver and a second radio transceiver co-located in a device platform. The device transmits an IDC interference indicator and a first IDC information from the first radio transceiver to a base station in a wireless communication network. The device transmits a second IDC information from the first radio transceiver to the base station if the device has not received any FDM-based IDC solution. The device continue to request for an FDM-based IDC solution if the device has received a TDM-based IDC solution.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
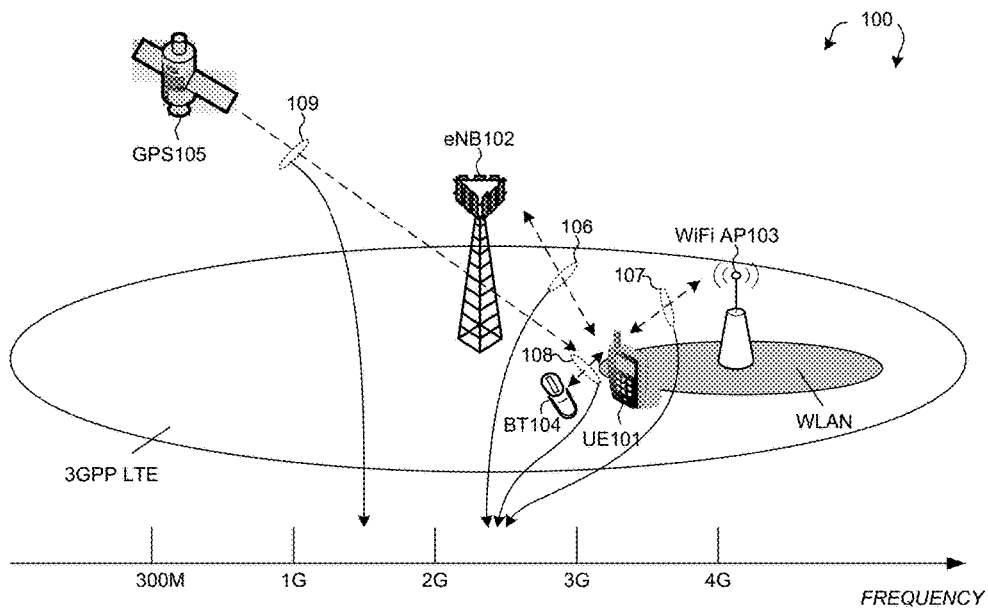
FIG. 1 illustrates a user equipment having multiple radio transceivers in a wireless communication system in accordance with one novel aspect.

FIG. 1 illustrates a user equipment having multiple radio transceivers in a wireless communication system 100 in accordance with one novel aspect. Wireless communication system 100 comprises a user equipment UE 101, a serving base station (e.g., evolved node-B) eNB 102, a Wi-Fi access point Wi-Fi AP 103, a Bluetooth device BT 104, and a global positioning system satellite device GPS 105. Wireless communication system 100 provides various network access services for UE 101 via different radio access technologies. For example, eNB 102 provides cellular radio network (e.g., a 3GPP Long-Term Evolution (LTE) or LTE-Advanced (LTE-A) system) access, Wi-Fi AP 103 provides local coverage in Wireless Local Area Network (WLAN) access, BT 104 provides short-range personal network communication, and GPS 105 provides global access as part of a Global Navigation Satellite System (GNSS). To better facilitate the various radio access technologies, UE 101 is a multi-radio terminal (MRT) that is equipped with multiple radios co-located in the same device platform (i.e., in-device).

Due to scarce radio spectrum resource, different radio access technologies may operate in overlapping or adjacent radio spectrums. As illustrated in FIG. 1, UE 101 communicates radio signal 106 with eNB 102, radio signal 107 with Wi-Fi AP 103, radio signal 108 with BT 104, and receives radio signal 109 from GPS 105. Radio signal 106 belongs to 3GPP Band 40, radio signal 107 belongs to one of the Wi-Fi channels, and radio signal 108 belongs to one of the seventy-nine Bluetooth channels. The frequencies of all those radio signals fall within a range from 2.3 GHz to 2.5 GHz, which may result in significant coexistence interference with each other. In one novel aspect, UE 101 comprises a central control entity that coordinates with different radio transceivers within the same device platform to mitigate in-device coexistence (IDC) interference.

There are different IDC solutions to mitigate the IDC interference. Under FDM (Frequency Division Multiplexing)-based solution, a UE reports interfered frequency and the network moves the UE away from the troubled frequency by handover. FDM-based IDC solution provides a quick approach with almost no performance impact at the expense of possible LTE spectrum waste. Under TDM (Time Division Multiplexing)-based solution, a UE suggests LTE TX pattern to the network by DRX (Discontinuous Reception)-like gap, subframe bitmap gap. TDM-based IDC solution provides the best spectrum efficiency with full range LTE B40 and Wi-Fi 2.4 GHz operation but suffers performance impact on throughput due to time-sharing between radios.

In one novel aspect, A UE controls IDC indication message generation to mitigate potential throughput impact on UE to maintain UE performance as much as possible. Under the proposed method, FDM-based solution is always preferred by the UE. Based on the IDC indication message generated by the UE, a network applies an IDC interference mitigation solution that prioritizes FDM-based solution. Specifically, the UE first sends an IDC message requesting FDM-based solution. In case the serving eNB does not respond, the UE sends a new IDC message by alternating IDC option. Even if a TDM-based solution has been received, the UE may continue requesting FDM-based solution to gain UE performance.

Figure 2:
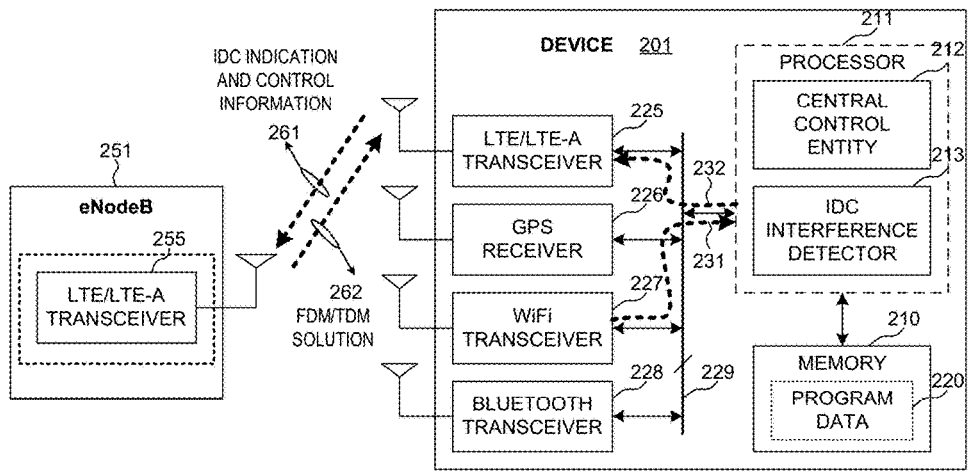
FIG. 2 illustrates one embodiment of a simplified block diagram of an LTE user equipment having a central control entity and IDC indication.

FIG. 2 illustrates one embodiment of a simplified block diagram of a wireless communication device 201 having a central control entity that carries out embodiments of the present invention. Wireless communication device 201 comprises memory 210 containing program and data 220, a processor 211 having a central control entity 212 and an IDC interference detector 213, a LTE/LTE-A transceiver 225, a GPS receiver 226, a WiFi transceiver 227, a Bluetooth transceiver 228, and bus 229. In the example of FIG. 2, central control entity 212 is a logical entity physically implemented within processor 211, which is also used for device application processing for device 201. Central control entity 212 is connected to various transceivers within device 201, and communicates with the various transceivers via bus 229. For example, WiFi transceiver 227 transmits Wi-Fi signal information and/or Wi-Fi traffic and scheduling information to central control entity 212 (e.g., depicted by a thick dotted line 231). Based on the received Wi-Fi information, central control entity 212 determines control information and transmits the control information to LTE/LTE-A transceiver 225 (e.g., depicted by a thick dotted line 232).

In one embodiment, LTE transceiver 225 further communicates with its serving base station eNB 251, transmitting IDC indication message 261 and in response receiving IDC mitigation solution 262 to mitigate IDC interference. Note that in another embodiment, the central control entity 212 can be a logical entity physically implemented within a processor that is physically located within LTE/LTE-A transceiver 225. Alternatively, central control entity 212 may physically be located within the Wi-Fi transceiver or within the Bluetooth transceiver. Central control entity 212 is coupled to various radio transceivers co-located within device 201 and communicates with the various local control entities via bus 229. The central control entity and IDC interference detector are circuits that can be configured and implemented by software, firmware, hardware, or any combination thereof. The circuits, when executed by the processors 211 (e.g., via executing program code 220), for example, allows UE 201 to detect IDC interference, generate and report IDC indication message, and receive IDC solution from eNB 251 to mitigate IDC interference.

How to effectively mitigate coexistence interference is a challenging problem for co-located radio transceivers operating in overlapping or adjacent frequency channels. The problem is more severe around the 2.4 GHz ISM (The Industrial, Scientific and Medical) radio frequency band. For example, the 2.4 GHz ISM band (e.g., ranges from 2400-2483.5 MHz) is used by both fourteen WiFi channels and seventy-nine Bluetooth channels. The WiFi channel usage depends on WiFi AP decision, while Bluetooth utilizes frequency hopping across the ISM band. In addition to the crowded ISM band, 3GPP Band 40 ranges from 2300-2400 MHz, and Band 7 UL ranges from 2500-2570 MHz, both are very close to the 2.4 GHz ISM radio frequency band.

Different solutions have been sought to avoid the coexistence interference. Among the different interference avoidance solutions, frequency division multiplexing (FDM), time division multiplexing (TDM), and power management are three main solutions proposed in accordance with the present invention. Furthermore, a central control entity is utilized to coordinate co-located transceivers and to facilitate the various interference avoidance solutions. The detailed embodiments and examples of the various interference avoidance solutions are now described below with accompanying drawings.

Figure 3:
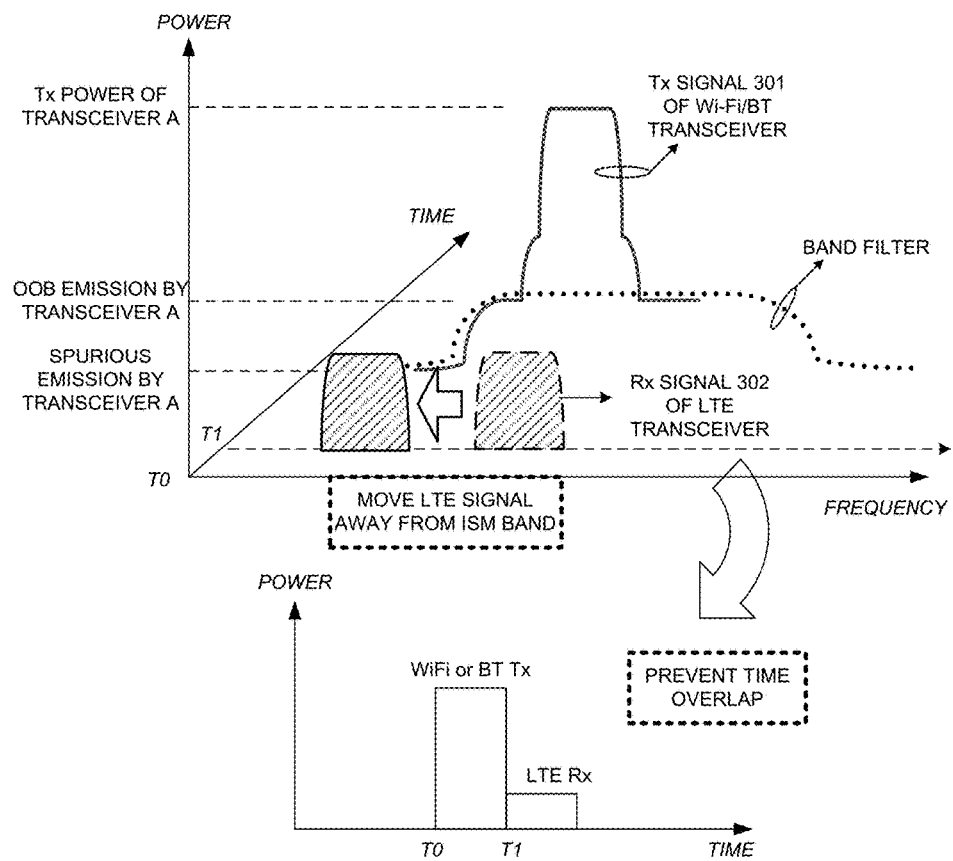
FIG. 3 illustrate examples of different FDM/TDM solutions for IDC interference mitigation.

FIG. 3 illustrates examples of FDM/TDM solutions for IDC interference mitigation. In the example of FIG. 3, an LTE transceiver is co-located with a Wi-Fi/BT transceiver. The transmitting (TX) signal by the Wi-Fi/BT transceiver (e.g., Wi-Fi/BT TX signal 301) is very close to the receiving (RX) signal for the LTE transceiver (e.g., LTE RX signal 302) in frequency domain. As a result, the out of band (OOB) emission and spurious emission by the WiFi/BT transceiver is unacceptable to the LTE transceiver resulted by imperfect TX filter and RF design. For example, the WiFi/BT TX signal power level may be still higher (e.g. 60 dB higher before filtering) than the LTE RX signal power level even after the filtering (e.g., after 50 dB suppression) without additional interference avoidance mechanism. As illustrated in FIG. 3, one possible FDM solution is to move the LTE RX signal 302 away from the ISM band by using handover procedure.

In LTE systems, most activities including handover procedures are controlled by the network. Therefore, at the initiation of LTE network-controlled UE-assisted FDM solutions, the UE can send an indication to the network to report the problem resulted by coexistence interference, or to recommend a certain action (e.g., handover) to be performed. For example, when there is ongoing interference on the serving frequency, indication can be sent by the UE whenever it has problem in LTE downlink (DL) or ISM DL reception it cannot solve by itself, and the eNB has not taken action yet based on RRM measurements. The triggers of indication, based on pre-defined criteria or configured by the eNB, could also be based on whether there is unacceptable interference on the serving frequency, or whether there is either ongoing or potential interference on other non-serving frequencies.

Device coordination capability is required to support the 3GPP FDM solution. From LTE perspective, LTE transceiver first needs to know (e.g., via an internal controller) whether other in-device transceiver(s) is transmitting or receiving within limited time latency. More specifically, the LTE transceiver needs to know the time duration when the LTE transceiver can measure the coexistence interference due to Wi-Fi/BT transmission, the time duration when LTE could receive without coexistence interference from Wi-Fi/BT transceivers. Based on that knowledge, the LTE transceiver can measure coexistence interference and evaluate which frequencies may or may not be seriously interfered (e.g., unusable frequencies) for LTE RX. The LTE transceiver will then indicate the unusable frequencies to the eNB to trigger FDM. From WiFi/BT/GNSS perspective, LTE transceiver also needs to know whether the LTE transmission in which frequencies would result in unacceptable performance to other WiFi/BT/GNSS in-device receivers. Once the LTE transceiver determines that significant coexistence interference would trigger the FDM solution, the UE sends an indication to the eNB for requesting handover from the current serving frequency to another frequency that is farther away from the WiFi/BT/GNSS signal.

Although FDM-based solution seemed promising, the assumption on the feasibility and effectiveness of FDM solution relies on the significant reduction of the IDC interference when the frequency separation between the serving frequency and the target frequency is enlarged. However, this may not be true because the level of reduction may not be sufficient to mitigate the IDC interference to an acceptable level. Furthermore, the WiFi coexistence interference problem exists across band 40 for TD-LTE. In fact, there is only 2.6 dB difference between 2320 MHz and 2370 MHz based on measurement results. Therefore, FDM-based solution may not always work, and the coexistence interference may remain high even moving LTE signals away from ISM band.

FIG. 3 also illustrates an example of a TDM solution for IDC interference mitigation. The basic principle of the TDM solution is to reduce time overlap between the Wi-Fi/BT TX and the LTE RX to avoid coexistence interference. In a DRX based TDM solution, a UE recommends DRX configuration parameters to its serving eNB. Similar to FDM solution, device coordination capability is required to support DRX based 3GPP TDM solution. For example, a control entity is used to derive the recommended DRX ON/OFF configuration to the eNB. The control entity receives information from co-located WiFi/BT transceivers including operation type (e.g. WiFi AP, BT master), traffic states (e.g. Tx or Rx) and characteristics (e.g. level of activity, traffic pattern), and priority demand, and determines the recommended DRX ON/OFF duration, DRX ON/OFF ratio, duty cycle, and starting time. Alternatively, in an HARQ reservation based 3GPP TDM solution, a UE recommends bitmap or some assistance information to help its eNB perform sub-frame level scheduling control for IDC interference mitigation.

In addition to DRX and HARQ based TDM solutions, UE autonomous denial is another type of TDM solution for interference avoidance. In one embodiment, the LTE transceiver stops UL TX to protect ISM or GNSS DL RX. This can only happen infrequently and for short-term events, otherwise the LTE connection performance will be impacted. In another embodiment, the WiFi or BT transceiver stops UL TX to protect LTE DL RX. This may be necessary to protect important LTE DL signal such as paging. The UE autonomous denial solution also requires device coordination capability (e.g., via an internal controller). The LTE transceiver needs to know the priority RX request from Wi-Fi/BT/GNSS receiver and how long to terminate the LTE UL TX. The LTE transceiver also needs to be able to indicate its own RX priority request to the internal controller to terminate Wi-Fi/BT UL TX. In addition, such knowledge needs to be indicated in real time manner or be indicated in a specific pattern.

Figure 4:
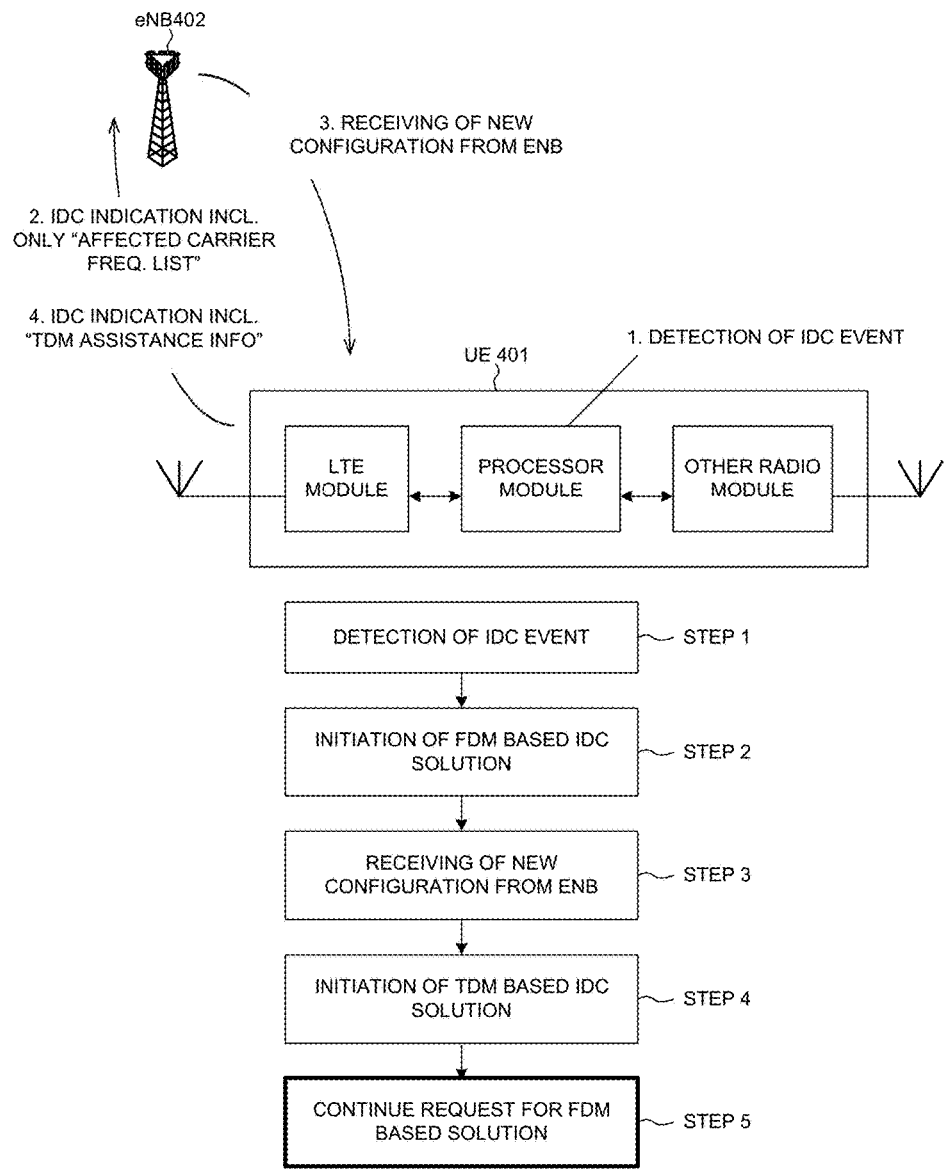
FIG. 4 illustrates an in-device coexistence (IDC) indication message flow for IDC interference mitigation in accordance with one novel aspect.

FIG. 4 illustrates an in-device coexistence (IDC) indication message flow for IDC interference mitigation in accordance with one novel aspect. UE 401 comprises a processor module (including a central control entity and an IDC interference detector), an LTE module, and other co-located radio modules. In step 1, UE 401 detects an IDC interference problem. In step 2, UE 401 generates an IDC indication message and sends it to eNB 402. The IDC indication message indicates the detected IDC interference problem, and includes an "affected carrier frequency list". The affected carrier frequency list informs the eNB which carrier frequencies are unusable due to IDC interference, and recommends the eNB to handover the UE to another carrier frequency (FDM-based solution). In addition, the IDC indication message does not include any TDM assistance information. As a result, the eNB is most likely to only focus on possible FDM-based solutions without considering TDM-based solutions. In step 3, UE 401 receives a new configuration from eNB 402 (optional) and applies the new configuration accordingly. If eNB 402 does not respond to the UE request, then in step 4, UE 401 generates a new IDC indication message and sends it to eNB 402. The new IDC indication message indicates the detected IDC interference problem, and includes "TDM assistance information" and optionally an "affected carrier frequency list". The TDM assistance information may recommend a new DRX configuration (TDM-based solution) based on the traffic and scheduling information of the other radio modules. The affected carrier frequency list provides another opportunity for the eNB to handover the UE to another carrier frequency. In step 5, if the UE receives a TDM-based solution, UE 401 may continue to request for FDM-based solution from eNB 402.

Based on the above-proposed method, FDM-based IDC interference mitigation solution is preferred even though TDM-based solution is acceptable. In general, the FDM-based solution makes other radio modules (e.g., Wi-Fi and Bluetooth) to operate simultaneously without affecting the LTE radio module. Therefore, the UE always starts with sending IDC indication for FDM-based solution first. If the network does not respond to the UE request, then the UE can send a new IDC indication by alternating IDC option (FDM/TDM toggling). For example, the UE can switch to TDM-based IDC if the UE cannot be handover to another carrier frequency. Finally, even if a TDM-based solution has been received, the UE may continue to request FDM-based solution to gain UE performance benefit.

Figure 5:
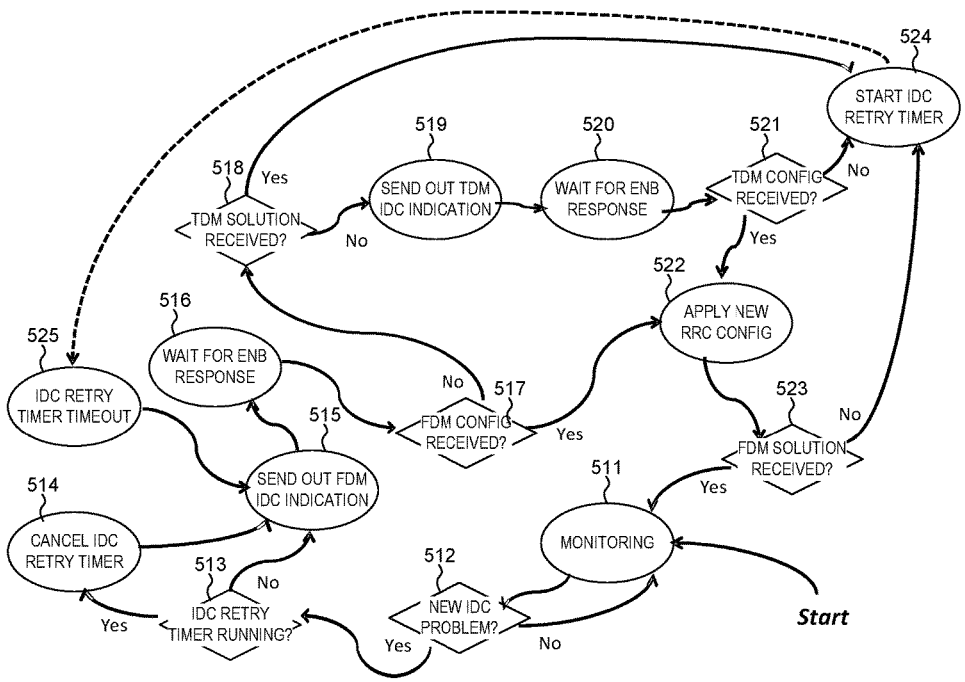
FIG. 5 illustrates an embodiment of the proposed IDC indication message flow with prioritized generation of the IDC indication message.

FIG. 5 illustrates an embodiment of the proposed IDC indication message flow with prioritized generation of the IDC indication message. In step 511, a UE starts monitoring IDC interference for all in-device co-located radio transceivers. In step 512, the UE determines whether it detects a new IDC interference problem. If the answer is no, then the UE goes back to step 511. If the answer is yes, then the UE goes to step 513 to check if an IDC retry timer is running. If the timer is running, then the UE cancels the IDC retry timer in step 514 and goes to step 515; otherwise, the UE goes to step 515 directly. In step 515, the UE sends out an IDC indication for FDM solution. In step 516, the UE waits for eNB response. In step 517, the UE checks if FDM-based new configuration has been received. If the answer is yes, then the UE goes to step 522 and applies the new configuration. If the answer is no, then the UE goes to step 518.

In step 518, the UE checks if TDM-based solution has been received. If the answer is no, then the UE goes to step 519 and sends out IDC indication for TDM solution. In step 520, the UE waits for eNB response. In step 521, the UE checks if TDM-based new configuration has been received. If the answer is yes, then the UE goes to step 522 and applies the new configuration. If the answer is no, then the UE goes to step 524 and starts the IDC retry timer. The UE then goes to step 525 waiting for the timer to timeout. Upon the timer expiry, the UE then goes back to step 515 again.

After applying the new RRC configuration in step 522, the UE goes to step 523 to check if the applied IDC solution is FDM-based or TDM-based. If the solution is FDM-based, then the UE goes back to step 511 to start monitoring. If the solution is TDM-based, then the UE goes to step 524 and starts the IDC retry timer. The UE then goes to step 525 waiting for the timer to timeout. Upon the timer expiry, the UE then goes back to step 515 to continue request for FDM-based solution.

Figure 6:
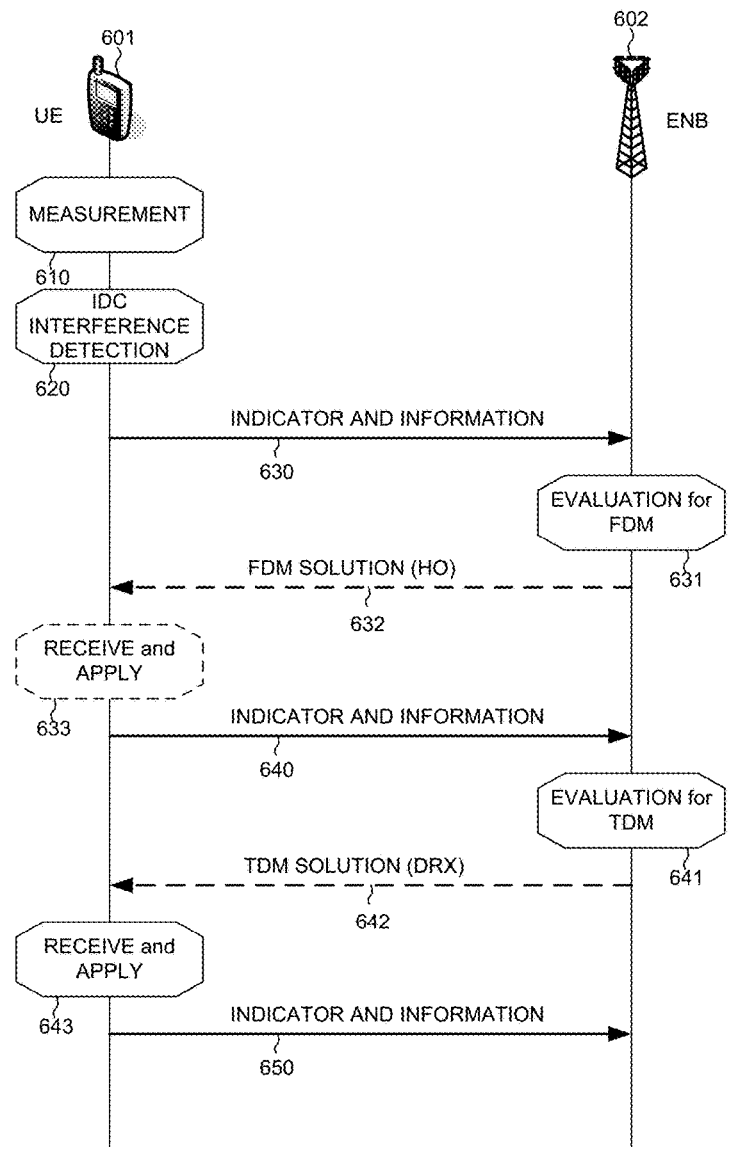
FIG. 6 illustrates communication and message exchange between a UE and an eNB for prioritized generation of an IDC indication message to mitigate IDC impact on UE performance.

FIG. 6 illustrates a communication and message exchange process between a UE 601 and an eNB 602 for prioritized generation of an IDC indication message to mitigate IDC impact on UE performance. In step 610, UE 601 first performs radio signal measurement of the serving cell. UE 601 also performs radio signal measurement of neighboring cells on different frequencies than the frequency of the serving cell. UE 601 derives IDC measurement results accordingly. The IDC measurement results may include received signal strength indicator (RSSI) (reference signal received power (RSRP)), signal to interference and noise ratio (SINR) (reference signal received quality (RSRQ)), channel quality indicator (CQI), block error rate (BLER), or throughput results. In step 620, UE 601 detects if there is any IDC interference problem between co-located radio modules based on the IDC measurement results. The detection may be done by comparing the received interference level (or total received power level) with or without the coexistence interference source transmission. Note that the IDC measurement results may not be the same as compared to traditional RSRP/RSRQ definition. Instead, the IDC measurement results are derived based on traffic/timing information of the co-located radios.

Once UE 601 detects IDC interference problem, UE 601 indicates the coexistence interference problem by sending an IDC interference indicator to eNB 602 (step 630). Note that the interference indicator itself only indicates the problem (e.g., neutral), without triggering any specific solution, or providing any specific recommendation on which solution to be applied. However, UE 601 may send additional IDC information accompanying the indicator to assist eNB 602 to evaluate which solution is more applicable. In accordance with one novel aspect, the IDC information include the recommendation of only FDM configurations (e.g., handover) based on the measurement results obtained in step 610, and omits additional TDM assistance information based on traffic and scheduling information of a co-located radio module (e.g., obtained from a central control entity).

After eNB 602 receives the IDC interference indicator, it starts to evaluate possible FDM-based solutions to mitigate the interference (step 631). First, eNB 602 evaluates whether any FDM solution is feasible. For example, eNB 1602 evaluates whether it is feasible to handover UE 601 to another cell located on different frequencies than the frequency of the original serving cell. Next, eNB 602 evaluates whether the coexistence interference problem can be effectively resolved by handover UE 601 to another frequency. The evaluation may be done by comparing the RSSI (RSRP) or SINR (RSRQ) measurement results over the original serving cell and the neighboring cells on different frequencies. In a first example, if the measurement result in a target cell is lower than the serving cell, this implies that the effectiveness of the FDM solution may also be lower. In a second example, if the RSSI (RSRP) measurement result on another cell over different frequency is higher than the one in the original cell, then the eNB may expect that the FDM solution to be sufficient. In a third example, if the SINR (RSRQ) measurement result on another cell over different frequency is much higher than the one in the original cell, then the eNB may expect that the FDM solution to be sufficient.

If eNB 602 finds a suitable cell for UE 601 to handover based on the evaluation, then eNB 602 triggers the FDM solution by initiating a handover procedure (step 632). On the other hand, eNB 602 may not trigger any FDM solution based on the evaluation. For example, eNB 602 may not find any suitable cell for handover. In another example, if the loading of the cell associated with the target frequency is higher than certain threshold, then eNB 602 may not trigger FDM solution. In yet another example, if the evaluation results show that the coexistence interference cannot be sufficiently resolved via handover to another frequency, the eNB 602 may not trigger FDM solution. If eNB 602 triggers the FDM solution, then UE 601 receives and applies the FDM-based IDC solution in step 633 to mitigate IDC interference.

If UE 601 does not receive any FDM solution, then in step 640, UE 601 sends a second IDC indicator with additional IDC information accompanying the indicator to assist eNB 602 to evaluate which solution is more applicable. This time, the IDC information include the recommendation of TDM configurations based on the measurement results obtained in step 610, and further includes additional TDM assistance information (e.g., DRX configuration) based on traffic and scheduling information of a co-located radio module (e.g., obtained from a central control entity).

In step 641, eNB 602 evaluates possible TDM-based solutions to mitigate the coexistence interference. The evaluation may be based on the co-located ISM traffic and scheduling information sent from UE 601 along with the interference indicator. For example, if the ISM traffic has certain periodicity, then eNB 602 may configure UE 601 with corresponding DRX configuration to reduce interference (step 642). In step 643, UE 601 receives and applies the TDM solution to mitigate IDC interference. Even if the UE already receives the TDM solution, the UE may continue to request for FDM solution. For example, after IDC retry timer expiry, UE 601 sends another IDC indicator and information in step 650 to eNB 602 for FDM-based IDC solution to gain UE performance.

Figure 7:
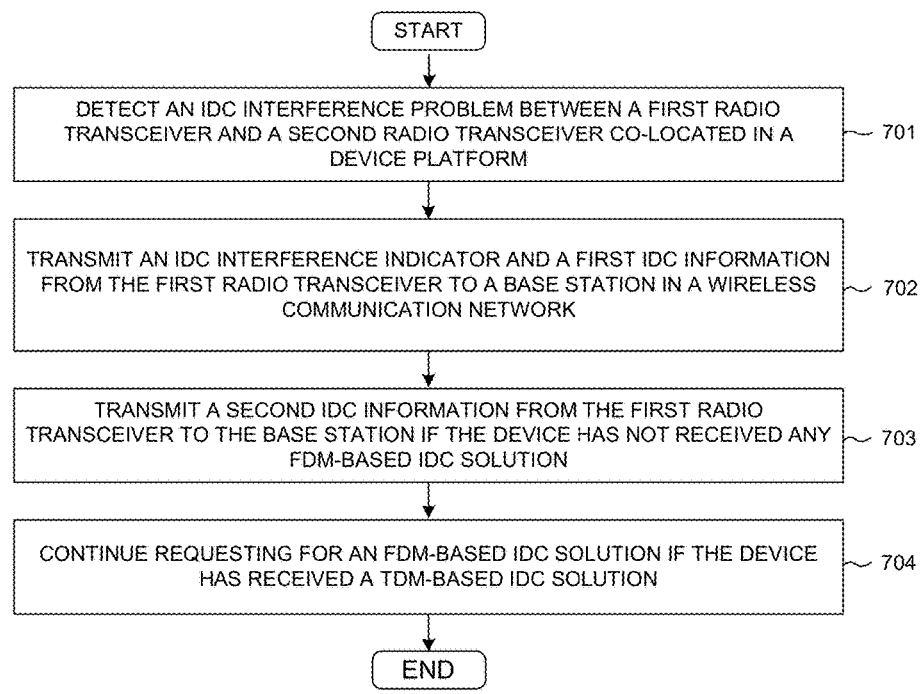
FIG. 7 is a flow chart of a method of IDC interference mitigation with prioritized generation of an IDC indication message by a user equipment (UE) in accordance with one novel aspect.

FIG. 7 is a flow chart of a method of IDC interference mitigation with prioritized generation of an IDC indication message by a user equipment (UE) in accordance with one novel aspect. In step 701, a UE detects an IDC interference problem between a first radio transceiver and a second radio transceiver co-located in a device platform. In step 702, the device transmits an IDC interference indicator and a first IDC information from the first radio transceiver to a base station in a wireless communication network. In step 703, the device transmits a second IDC information from the first radio transceiver to the base station if the device has not received any FDM-based IDC solution. In step 704, the device continue to request for an FDM-based IDC solution if the device has received a TDM-based IDC solution.

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method, comprising:
    (a) detecting an in-device coexistence (IDC) interference problem between a first radio transceiver and a second radio transceiver co-located in a device platform;
    (b) transmitting an IDC interference indicator and a first IDC information from the first radio transceiver to a base station in a wireless communication network;
    (c) transmitting a second IDC information from the first radio transceiver to the base station if the device has not received any frequency-division-multiplexing-based (FDM-based) IDC solution, wherein the second IDC information is different from the first IDC information;
    (d) receiving an IDC solution from the base station and applying the IDC solution;
    (e) determining whether the IDC solution is FDM-based or time-division-multiplexing-based (TDM-based); and
    (f) continue requesting for an FDM-based IDC solution if the received IDC solution is TDM-based.

2. The method of claim 1, wherein the first IDC information comprises a list of affected frequencies due to the IDC interference problem.

3. The method of claim 2, wherein the first IDC information does not contain TDM assistance information based on traffic and scheduling information of the second radio transceiver.

4. The method of claim 1, wherein the second IDC information comprises TDM assistance information based on traffic and scheduling information of the second radio transceiver.

5. The method of claim 4, wherein the second IDC information further comprises a list of affected frequencies due to the IDC interference problem.

6. The method of claim 1, wherein the FDM-based IDC solution comprises handing over the first radio transceiver to another carrier frequency.

7. The method of claim 1, wherein the TDM-based IDC solution comprises configuring the first radio transceiver with different Discontinuous Reception (DRX) operation parameters.

8. The method of claim 1, wherein the requesting in (d) involves transmitting a second IDC interference indication to the base station.

9. The method of claim 8, wherein the device transmits the second IDC interference indication upon expiration of an IDC retry timer or an IDC prohibit timer.

10. The method of claim 8, wherein the second IDC interference indication further comprises recommendation for FDM configuration.

11. A wireless device, comprising:
    a detector that detects an in-device coexistence (IDC) interference problem between a first radio transceiver and a second radio transceiver co-located in the wireless device platform;
    a radio frequency (RF) transmitter that transmits an IDC interference indicator and a first IDC information from the first radio transceiver to a base station in a wireless system, wherein the transmitter also transmits a second IDC information from the first radio transceiver to the base station if the device has not received any frequency-division-multiplexing-based (FDM-based) IDC solution, wherein the second IDC information is different from the first IDC information;
    an RF receiver that receives an IDC solution from the base station, wherein the UE applies the IDC solution and determines whether the IDC solution is FDM-based or time-division-multiplexing-based (TDM-based); and
    a central control circuit that requests for an FDM-based IDC solution if the received IDC solution is TDM-based.

12. The device of claim 11, wherein the first IDC information comprises a list of affected frequencies due to the IDC interference problem.

13. The device of claim 12, wherein the first IDC information does not contain TDM assistance information based on traffic and scheduling information of the second radio transceiver.

14. The device of claim 11, wherein the second IDC information comprises TDM assistance information based on traffic and scheduling information of the second radio transceiver.

15. The device of claim 14, wherein the second IDC information further comprises a list of affected frequencies due to the IDC interference problem.

16. The device of claim 11, wherein the FDM-based IDC solution comprises handing over the first radio transceiver to another carrier frequency.

17. The device of claim 11, wherein the TDM-based IDC solution comprises configuring the first radio transceiver with different Discontinuous Reception (DRX) operation parameters.

18. The device of claim 11, wherein the requesting in (d) involves transmitting a second IDC interference indication to the base station.

19. The device of claim 18, wherein the device transmits the second IDC interference indication upon expiration of an IDC retry timer or an IDC prohibit timer.

20. The device of claim 18, wherein the second IDC interference indication further comprises recommendation for FDM configuration.

\* \* \* \* \*